United States Patent [19]

Shiau

[11] Patent Number: 5,341,226
[45] Date of Patent: Aug. 23, 1994

[54] AUTOMATIC IMAGE SEGMENTATION FOR COLOR DOCUMENTS

[75] Inventor: Jeng-Nan Shiau, Webster, N.Y.

[73] Assignee: Xerox Corporation, Stamford, Conn.

[21] Appl. No.: 51,146

[22] Filed: Apr. 22, 1993

[51] Int. Cl.⁵ .............................................. G03F 3/08
[52] U.S. Cl. ................................ 358/518; 358/520; 358/534; 382/17; 382/56
[58] Field of Search .............. 358/453, 448, 463, 462, 358/456, 534, 515, 518, 520; 382/47, 56, 48, 9

[56] References Cited

U.S. PATENT DOCUMENTS

| | | | |
|---|---|---|---|
| 3,294,896 | 12/1966 | Young, Jr. | 178/5 |
| 4,194,221 | 3/1980 | Stoffel | 358/283 |
| 4,251,837 | 2/1981 | Janeway, III | 358/283 |
| 4,275,413 | 6/1981 | Sakamoto et al. | 358/80 |
| 4,447,830 | 9/1981 | Stoffel | 358/283 |
| 4,500,919 | 2/1985 | Schreiber | 358/78 |
| 4,509,195 | 4/1985 | Nadler | 382/51 |
| 4,547,811 | 10/1985 | Ochi et al. | 358/280 |
| 4,556,918 | 12/1985 | Yamazaki et al. | 358/283 |
| 4,559,563 | 12/1985 | Joiner, Jr. | 358/283 |
| 4,578,714 | 3/1986 | Sugiura et al. | 358/283 |
| 4,707,727 | 4/1986 | Penney | 358/10 |
| 4,730,221 | 3/1988 | Roetling | 358/298 |
| 4,731,662 | 3/1988 | Udagawa | 358/75 |
| 4,736,253 | 4/1988 | Shida | 358/283 |
| 4,791,476 | 7/1988 | Chauvel | 358/11 |
| 4,811,115 | 3/1989 | Lin et al. | 358/283 |
| 5,153,576 | 8/1990 | Harrington | 340/793 |
| 5,282,051 | 1/1994 | Walker | 358/401 |
| 5,293,430 | 3/1994 | Shiau | 382/42 |

FOREIGN PATENT DOCUMENTS

| | | | |
|---|---|---|---|
| 0521662 | 1/1993 | European Pat. Off. | H04N 1/40 |
| 2153619 | 8/1985 | United Kingdom | H04N 1/40 |

OTHER PUBLICATIONS

Fact Sheet: Data Translation, RGB/HSI and HSI/RGB Converter Chips, DT 7910 and DT 7911; pp. 1-23.

*Primary Examiner*—Edward L. Coles, Sr.
*Assistant Examiner*—John Ning
*Attorney, Agent, or Firm*—Mark Costello

[57] ABSTRACT

Method and apparatus for processing color document images to determine the presence of particular image types in order to designate areas for optimal image processing thereof. A multi-separation image defined in terms of color density for each separation is converted to a luminance-chrominance definition, where one component of the image represents image intensity. An image segmentation process operates on the image intensity signal, the results of which are used to determine processing of the multi-separation image.

16 Claims, 1 Drawing Sheet

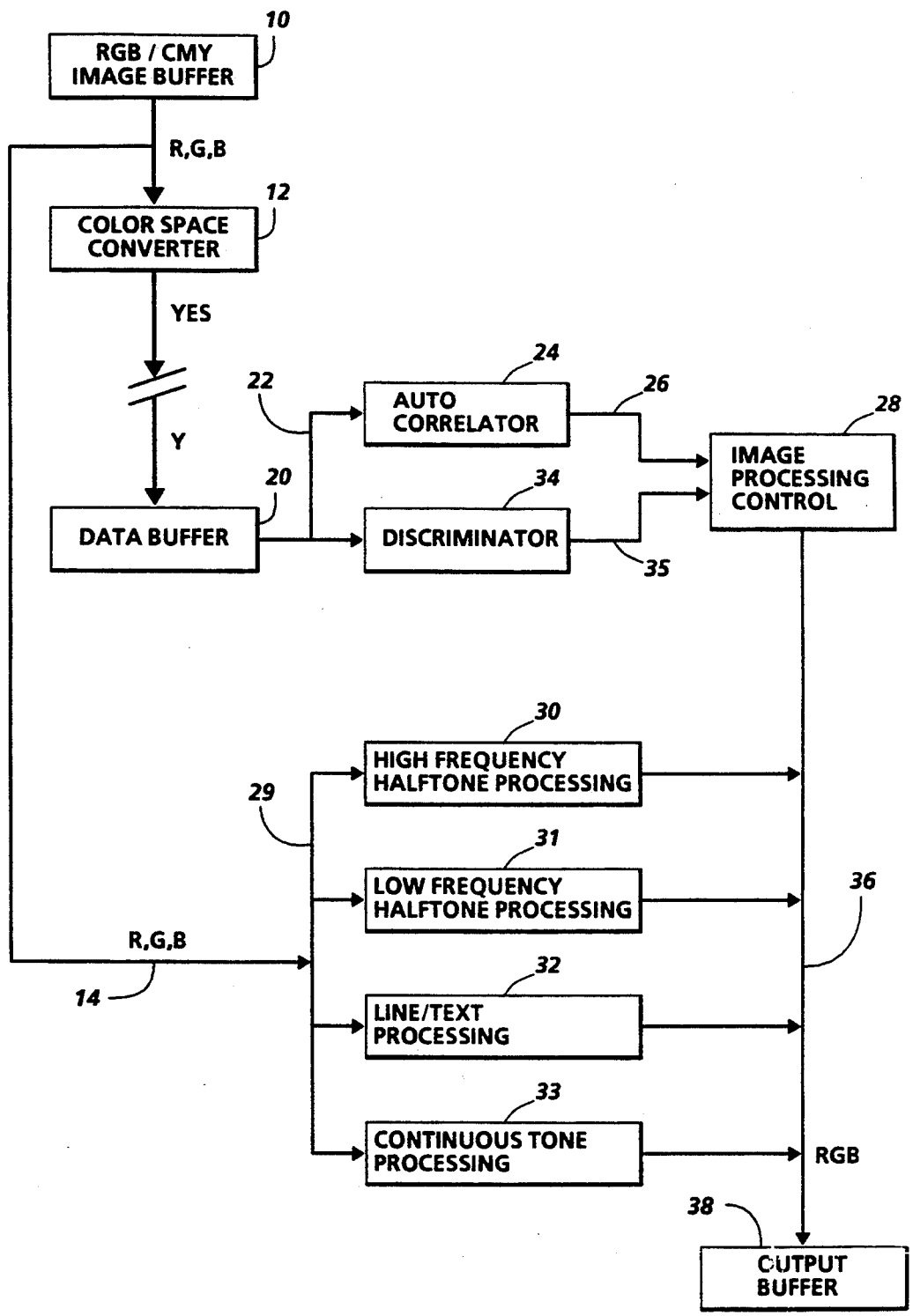

AUTOMATIC IMAGE SEGMENTATION FOR COLOR DOCUMENTS

The present invention relates generally to a system for processing color document images, and more particularly to a method for determining the appropriate image type segmentation requirements for a color image.

CROSS REFERENCE

Cross reference is made to U.S. Pat. Ser. No. 08/004479 by Shiau (published at EP-A2 0 521 662 on Jan. 7, 1993).

INCORPORATION BY REFERENCE

U.S. Pat. No. 4,194,221 to Stoffel, U.S. Pat. No. 4,811,115 to Lin et al. and U.S. Pat. Ser. No. 08/004479 by Shiau (published at EP-A2 0 521 662 on Jan. 7, 1993) are herein specifically incorporated by reference for their teachings regarding image segmentation. U.S. Pat. No. 4,275,413 to Sakamoto and U.S. Pat. No. 4,500,919 to Schreiber are herein incorporated by reference for their teachings regarding conversion from a first color space to a second.

BACKGROUND OF THE INVENTION

In the reproduction of copies of an original document from video image data created, for example, by electronic raster input scanning from an original document, one is faced with the limited resolution capabilities of the reproducing system and the fact that output devices are mostly binary. This is particularly evident when attempting to reproduce halftones, lines and continuous tone images. Of course, an image data processing system may be tailored so as to offset the limited resolution capabilities of the reproducing apparatus used, but this is difficult due to the divergent processing needs required by the different types of image which may be encountered. In this respect, it should be understood that the image content of the original document may consist entirely of high frequency halftones, low frequency halftones, continuous tones, or line copy, or a combination, in some unknown degree, of some or all of the above. In the face of these possibilities, optimizing the image processing system for one image type in an effort to offset the limitations in the resolution capability of the reproducing apparatus used, may not be possible, requiring a compromise choice which may not produce acceptable results. Thus, for example, where one optimizes the system for low frequency halftones, it is often at the expense of degraded reproduction of high frequency halftones, or of line copy, and vice versa.

Color original documents, where all or part of the image is represented in one or more colors presents an additional challenge for segmentation. Typically, these images are defined in terms of Red-Green-Blue (RGB) color density signals, which represent image signals derived in scanning the image with intensity sensitive devices with appropriate color filters interposed in the path of light reflected thereto from the color document, or created on a document creating computer workstation. Each separation of the RGB color density signals requires processing in the same manner as the black and white images, e.g., continuous tone images required halftoning, halftoned images requires descreening and rescreening, and text/line art requires thresholding. This processing may occur after the image has been converted to the cyan-magenta-yellow (CMY) color density signals, that will ultimately provide driving signals for a color printer. Each separation could be processed separately with image segmentation algorithms, however, such parallel circuitry or processing is expensive in terms of hardware, and will require a downstream "separation reconciliation" process for handling inconsistent results at each separation.

As one example of the problems encountered, reproduction of halftoned images with screening tends to introduce moire, caused by the interaction of the original screen frequency and applied screen frequency. Although the use of high frequency line screens, as believed used in the Canon CLC500 Color Copier, can reduce the problem, the artifact can still occur in some images. In a networked environment particularly, it is desirable that the scanner detect the halftone and low pass filter the document image into a continuous tone for subsequent halftone reproduction by printers in the network in accordance with their particular capabilities.

In U.S. Pat. Ser. No. 08/004479 by Shiau, the question of whether a color image was scanned by a black and white capable scanner was addressed, so that color document reproduction on a black and white printer could be optimized. Not addressed was the problem of optimally reproducing color images for color originals, such as by, for example, the Xerox 5775 Color Copier, which includes a scanner for scanning color documents, a color document printer and associated processing for preparing scanned documents for printing.

In U.S. Pat. No. 4,194,221 to Stoffel, the problem of image segmentation was addressed by applying a discrimination function instructing the image processing system as to the type of image data present and particularly, an auto correlation function to the stream of pixel data, to determine the existence of halftone image data. Such a function is expressed as:

$$A(n) = \sum_{t=0}^{t=\text{Last}} [p(t) \times p(t + n)] \quad (1)$$

where
n = the bit or pixel number;
p = the pixel voltage value; and
t = the pixel position in the data stream.

Stoffel describes a method of processing automatically a stream of image pixels representing unknown combinations of high and low frequency halftones, continuous tones, and/or lines to provide binary level output pixels representative of the image. The described function is applied to the stream of image pixels and, for the portions of the stream that contained high frequency halftone image data, notes a large number of closely spaced peaks in the resultant signal. The correlator circuits described in Stoffel's embodiment, however, are very expensive, as they must provide a digital multiplication function. Accordingly, as a practical matter, Stoffel requires as a first step, reduction of the amount of data handled, by initially thresholding image data against a single threshold value, to reduce the image to a high contrast black or white image. However, depending on the selection of the threshold as compared to the intensity of the image, significant amounts of information may be lost in the thresholding process. For example, if the threshold level is set to distinguish in the middle of the intensity range, but the image has significant variations through the darker gray levels, the thresholded result does not indicate the variations. This results in an undesirable loss of image information. While it may be possible to vary the threshold value adaptively from original to original and from image area to image area, such algorithms tend to be complicated and work well only for a restricted class of images such as line images. In U.S. Pat. No. 4,811,115 to Lin et al, the auto correlation function is calculated for the stream of halftone image data at selected time delays which are predicted to be indicative of the image frequency characteristics, without prior thresholding. The arithmetic function used in that auto correlation system is an approximation of the auto correlation function using logical functions and addition, rather than the multiplication function used in U.S. Pat. No. 4,194,221 to Stoffel. Valleys in the resulting auto correlated function are detected to determine whether high frequency halftone image data is present.

U.S. Pat. No. 08/004479 by Shiau is directed to the particular problem noted in the use of the auto correlation function of the false characterization of a portion of the image as a halftone, when in fact it would be preferable for the image to be processed as a line image. Examples of this defect are noted particularly in the processing of Japanese Kanji characters and small Roman letters. In these examples, the auto correlation function may detect the image as halftones and process accordingly, instead of applying a common threshold through the character image. The described computations of auto correlation are one dimensional in nature, and this problem of false detection will occur whenever a fine pattern that is periodic in the scan line or fast scan direction is detected, In the same vein, shadow areas and highlight areas are often not detected as halftones, and are then processed with the application of a uniform threshold.

GB 2,153,619A provides a similar determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency halftone or continuous tone image. The thresholding step in this method has the same undesirable effect as described for Stoffel.

Of background interest in this area are U.S. Pat. No. 4,556,918 to Yamazaki et al. showing an arrangement assuming a periodicity of an area of halftone dots which are thresholded against an average value derived from the area to produce a density related video signal; U.S. Pat. No. 4,251,837 to Janeway, III. which shows the use of a three decision mode selection for determining threshold selection based on gradient constants for each pixel; U.S. Pat. No. 4,578,714 to Sugiura et al. which shows random data added to the output signal to eliminate pseudo-outlines; U.S. Pat. No. 4,559,563 to Joiner, Jr. suggests an adaptive prediction for compressing data based on a predictor which worked best for a previous pixel block; and U.S. Pat. No. 3,294,896 to Young, Jr. teaches the usefulness of thresholding in producing an image from a binary digital transmission system.

U.S. Pat. No. 4,509,195 to Nadler describes a method for binarization of a pattern wherein two concentric rings around a pixel are evaluated to determine contrast values, and the contrast values are used then to determine whether the pixel and the surrounding areas have a light or dark quality. U.S. Pat. No. 4,547,811 to Ochi et al. teaches a method of processing gray level values, depending on the density level of blocks of pixels, and their difference from a minimum or maximum value. The blocks are then processable by a halftone processing matrix depending on the difference value, U.S. Pat. No. 4,730,221 to Roetling discloses a screening technique where values of gray over an image are evaluated to determine a minimum and maximum level, in order to determine constant levels of gray. U.S. Pat. No. 4,736,253 to Shida discloses a method of producing a halftone dot by selectively comparing image signals with highlight and shadow reference values, for determination of the binarization process.

The patents cited herein are incorporated by reference for their teachings.

SUMMARY OF THE INVENTION

In accordance with the invention there is provided a method and apparatus for applying image segmentation to the luminance component of a color document image in a luminance-chrominance signal representation thereof, for the purpose of determining the image types present in the overall color document image. Such determination is then applied respectively to each separation of the color document image to be printed.

In accordance with one aspect of the invention, an original color document image defined in terms of a red-green-blue (RGB) color density signal representation is converted on a pixel-by-pixel basis to a luminance-chrominance color space representation in which one component signal thereof represents overall image intensity. The resultant intensity signal is processed as a black and white signal for the purpose of determining the image-types present. The results of the determination are then used to process each separation of the RGB color density signals.

In accordance with another aspect of the invention there is provided a method of optimally processing a multi-separation document image in accordance with image types present therein, the steps comprising:
  receiving from an image source a multi-separation document image and storing the multi-separation image in a data buffer;
  with a color space converter, converting the multi-separation document image received from the data buffer to a luminance-chrominance description of the document image, where one component thereof represents intensity of the document image;
  with an image segmentation circuit, receiving the intensity component of the document image and determining the image-type present in an area of the image therefrom;
  with a multi-image type image processor also receiving the multi-separation document image from the data buffer, processing a corresponding area of the multi-separation document image in accordance with the determined image type.

The Figure demonstrates a block diagram of an image data processing system wherein the present invention finds particular use.

Image data in the form of video image signals, (hereinafter, pixels), which may be either analog or digital voltage representations of the image, is provided from a suitable source. For example, the image data pixels may be obtained through line by line scanning of an image bearing original by one or more photosensitive elements, such as a multiple photosite array of charge coupled devices, commonly referred to as CCD's. Line by line scanning of an image bearing original for the derivation of image data is well known and does not form a part of the present invention.

In content, the original may be composed entirely of lines, low frequency halftone image(s), high frequency halftone image(s), continuous tone image(s), or combinations thereof, where each of these components is an "image type". Preferably, each image type is processed in a distinct manner. Where the original consists of lines, as for example a typed page, the image pixels may be converted to either one of two signal levels, one representing non-image or background areas and the other image areas. This is commonly accomplished with a fixed level thresholding process.

A continuous tone image comprises an unscreened image, typically a photograph. When scanned, the voltage signal of the pixels produced are representative of the gray levels making up the picture. This is commonly accomplished with a varying level thresholding process, referred to as dithering, screening or halftoning.

A halftone image, typically a picture or scene, is one which has been reproduced through a screening process. One example is a newspaper picture. The screen used may be either a high or low frequency screen. A high frequency screen is arbitrarily defined herein as one having a frequency of 100 cycles per inch or more, while a low frequency screen is defined as one having a frequency less than 100 cycles per inch. Halftone images, therefore, comprise a pattern of discrete dots, the frequency of which depends upon the screening frequency used. High frequency halftones are descreened and rescreened with a screen appropriate for the printer. Low frequency halftones require a much larger filter to descreen. It is best reproduced with error diffusion.

The original color document images referred to herein are typically multiple separation images. They may initially be defined in terms of additive color (RGB) or subtractive color (CMY or CMYK) space, which will be referred to hereinafter as color density signals, as each element of the triplet of signals defining color of a single pixel represents density of the component color. Typically, the original color document is derived by scanning with a color scanner, a device which samples for a single discrete area of the document, light reflected from a document through an appropriate color filter to derive three density measurements each representing a color component of the detected signal. They may also be derived by a computer or workstation programmed in accordance with document creation application software, or from a data storage device.

With reference now to the drawing where the showing is for the purpose of illustrating a preferred embodiment of the invention and not for limiting same, in an application incorporating the present invention, such as that described, for example, in U.S. Pat. No. 4,194,221 to Stoffel and U.S. Pat. No. 08/004479 by Shiau, the Figure demonstrates handling of image data, which may be derived from any number of sources, including a scanner, a graphics workstation, an electronic memory or other storage element, etc.

In accordance with the invention, RGB color density image signals representing the original color document and derived perhaps by scanning a color original document, and temporarily stored at buffer 10 are initially converted at color space converter 12 to a luminance-chrominance signal format in which one signal represents intensity, while the remaining signals represent some combination of hue and saturation. Suitable luminance-chrominance signal formats include many luminance-chrominance color space representations as LC1C2, CIE/L*a*b, CIE/LUV, HSV, HSI, or Xerox YES, and many others. Hereinafter, these signals will be referred to as luminance-chrominance signals, where each signal represents one of the luminance-chrominance triplet defining the color. Hardware for color space conversion is well documented, as in U.S. Pat. No. 4,500,919 to Schreiber (which shows color space transformation from RGB to LC1C2) where the intensity component L is given by $$L = 0.299R + 0.621G + 0.80B$$

RGB/HSI Converter Chip DT7910, a product of Data Translation, Inc., provides an intensity signal I given by $$I = (R + G + B)/3$$

The intensity component Y as defined in the Xerox YES linear Color spaces is given as $$Y = 0.253R + 0.684G + 0.063B$$

The color space conversions of color density signals to luminance-chrominance signals are well known and accordingly, are easily hardwired or calculated with appropriately programmed microprocessors, or with look-up table interpolation arrangements. While the calculation arrangement may produce all three luminance-chrominance signals, generally, only the luminance or intensity value, in the example Y, is stored at data buffer 20 for subsequent processing. In practice, YES space is chosen for use in the segmentation circuit, as Y appears to give greater response in detecting halftones.

Buffer 20, which comprises any suitable commercially available serial in/serial out multi-row buffer having a bit storage capacity sufficient to temporarily store multiple scan lines of intensity signals, permits processing of image data in blocks of several lines.

The intensity signal Y is made available to the image processing system along data bus 22. Intensity signal Y at this point is in a gray format, for example, 6–8 bits per signal. To detect the presence of high frequency halftone image data, a one dimensional block of intensity signals is unloaded from buffer 20 onto a data bus 22. The block of intensity signals is passed to halftone detector/auto correlator 24 which auto correlates each intensity signal group in accordance with a predetermined algorithm to determine if the intensity signals contain halftones or not, as shown in U.S. Pat. No. 08/004479 by Shiau (published at EP-A2 0 521 662 on Jan. 7, 1993). An output on line 26 instructs the image processing controller 28 to handle the data in accordance with whether high or frequency halftone image data has been detected.

The presence of line copy and/or continuous tone data is determined by discriminator 34. Discriminator 34 functions to produce an output on line 35 indicative of the presence of line copy or continuous tone image data, instructing image processing control 28 to handle data in accordance therewith. Halftone and line copy and/or continuous tone data detection was fully described in U.S. Pat. No. 08/004479 by Shiau (published at EP-A2 0 521 662 on Jan. 7, 1993) incorporated herein by reference.

Color image data in the RGB format stored at RGB buffer 10 is directed along line 14 to image bus 29, which makes the data available for the image processing circuits, as described below. It will no doubt be appreciated that the illustration of the Figure is schematic for purposes of simplicity, and that a likely embodiment would provide parallel processing of each separation of the RGB image. Image processing control 28 determines for the entire document image, how the image is processed for all the separations. For example, for an area in which the Y component determines low frequency halftones are present, that area in each of the RGB separation is processed optimally for low frequency halftones.

Image processing control 28 serves essentially as a switch to allow data from the image processing sections, including high frequency halftone processing section 30, low frequency halftone processing 31 and line image processing section 32 and continuous tone processing section 33, to flow through bus 36 to an output buffer 38 in accordance with the detection of data in the particular mode. Image processing control 28 controls data bus 36 to allow data flow from each processing section, in accordance with the signals passed thereto from halftone detector 24 or discriminator 34. Each processing section processes all image signals in accordance with its function, but only that data appropriately processed is allowed to pass to the output buffer 38. Signals improperly processed are discarded.

In summary, despite the increased data available in a multi separation image, image segmentation has been found effective, based on the intensity component of the image when converted to luminance-chrominance space. The image-types determined from the luminance component, using standard black and white techniques can be used to determine optimal processing of the multi-separation image.

The invention has been described with reference to a preferred embodiment. Obviously modifications will occur to others upon reading and understanding the specification taken together with the drawing. This embodiment is but one example, and various alternatives, modifications, variations or improvements may be made by those skilled in the art from this teaching which are intended to be encompassed by the following claims.

I claim:

1. A method of processing a multi-separation document image in accordance with image types present therein, the steps comprising:

receiving from an image source a multi-separation document image, where each pixel in the image is represented by a triplet of color density image signals, and storing at least a portion thereof representing an area of the document image in a data buffer;

with a color space converter, converting each color triplet of image signals in the portion received from the data buffer to a luminance-chrominance signal description of the document image, where one component signal thereof represents intensity of the document image;

with an image segmentation circuit, receiving the intensity component of the document image from the color space converter and determining image types present in an area of the image therefrom;

with a multi-image type image processor also receiving the color density signal from the data buffer, processing the color density signals for the portion in accordance with the determined image type; and directing color density signals processed in accordance with determined image type to an output data buffer.

2. The method as described in claim 1, wherein the color density image signals are represented in terms of red-green-blue space.

3. The method as described in claim 2, wherein the luminance-chrominance signal description is defined as YES space and the intensity representing signal of the document image is given as Y, where Y is a function of the color density signals given as $$Y = 0.253R + 0.684G + 0.063B.$$

4. The method as described in claim 1 where the color density image signals are represented in terms of cyan-magenta-yellow space.

5. The method as described in claim 1 wherein the luminance-chrominance space is defined as YES space.

6. The method as defined in claim 1, wherein the image segmentation circuit includes an autocorrelator circuit, operating on intensity signals to determine the presence of high and low frequency halftones.

7. The method as defined in claim 1, wherein the image segmentation circuit includes a discriminator circuit, operating on intensity signals to determine the presence of line art or text, or continuous tones.

8. The method as defined in claim 1, wherein the image segmentation circuit distinguishes areas of the image including the image types high frequency halftone, low frequency halftones, line art or text and continuous tone.

9. In a color printing system including a source of color density image signals representing multi separation color document images, an image processing arrangement processing the color density image signals preparatory to output, and an image type segmentation circuit, controlling the image processing arrangement to process the image signals in accordance with the image type thereof, comprising:

an image storage buffer, suitable for receiving color density signals representing at least a portion of the multi separation color document image;

a color space converter, connected to the image storage buffer and receiving color density signals therefrom and converting multi separation color density image signals into a luminance-chrominance image signals, in which at least one component signal thereof represents overall image intensity;

said image type segmentation circuit receiving and operative on said image intensity signal, and producing a control signal responsive thereto indicating image type;

an image processing arrangement controller, responsive to the control signal generated at the image type segmentation circuit and controlling operation of said image processing arrangement;

said image storage buffer and said image processing arrangement connected for transfer of said color density signals to said image processing arrangement, for processing thereof under control of said image processing arrangement controller; and an output device, connected to said image processing arrangement, for receiving processed color density signals, processed in accordance with image type.

10. The device as described in claim 9, wherein the color density image signals are represented in terms of red-green-blue space.

11. The device as described in claim 10, wherein the luminance-chrominance signal description is defined as YES space and the intensity representing signal of the document image is given as Y, where Y is a function of the color density signals given as $$Y = 0.253R + 0.684G + 0.063B.$$

12. The device as described in claim 9 where the color density image signals are represented in terms of cyan-magenta-yellow space.

13. The device as described in claim 9 wherein the luminance-chrominance space is defined as YES space.

14. The device as defined in claim 9, wherein the image segmentation circuit includes an autocorrelator circuit, operating on intensity signals to determine the presence of high and low frequency halftones.

15. The device as defined in claim 9, wherein the image segmentation circuit includes a discriminator circuit, operating on intensity signals to determine the presence of line art or text, or continuous tones.

16. The device as defined in claim 9, wherein the image segmentation circuit distinguishes areas of the image including the image types high frequency halftone, low frequency halftones, line art or text and continuous tone.

* * * * *